3,004,934
FLEXIBLE SHOCK-ABSORBING POLYURETHANE FOAM CONTAINING STARCH AND METHOD OF PREPARING SAME

Lucian P. Dosmann and Robert N. Steel, South Bend, Ind., assignors to United States Rubber Company, New York, N.Y., a corporation of New Jersey
No Drawing. Filed Oct. 31, 1957, Ser. No. 693,531
7 Claims. (Cl. 260—2.5)

This invention relates to a method of making a flexible, shock-absorbing polyurethane elastomer foam, involving the use of starch, as well as to the starch-containing polyurethane elastomer foam so produced.

The invention is concerned particularly with the manufacture of a shock-absorbing foam or sponge material, that is especially useful in crash padding, cushions, mattresses, and similar articles. Such foam is of course flexible. The invention is directed to a method of preparing such foam or articles by casting liquid materials, and the invention has for its principal object the rapid, convenient, and economical conversion of a liquid preparation into a sponge material that has a high modulus at a given density and is unusually strong and resistant to deterioration upon aging or upon exposure to adverse influences such as heat, moisture, solvents, oxygen, etc.

The invention is based on the unexpected discovery that by incorporating starch in the polyurethane foam producing materials, it is possible to obtain a liquid casting composition that can be cast in a desired shape, and converted rapidly into a foamed structure having an unusual combination of useful physical properties. Although it is not desired to limit the invention to any particular theory of operation, it is believed possible that the improved properties of the product are due at least in part to a chemical reaction between the starch and the foam-producing materials.

In practicing the invention there are involved initially two basic ingredients, namely, an organic polyisocyanate, and a poly-functional material, usually a polymer having terminal alcoholic hydroxyl groups, such as a polyester or polyether. These two basic materials are typically first pre-reacted to provide a liquid material which we call the "pre-polymer," although the foam of the invention may also be made by using them in the unreacted state, by the so-called "one-shot" technique.

The polyisocyanates employed in preparing the liquid intermediate reaction product or pre-polymer are generally diisocyanates, for example, polymethylene diisocyanates such as ethylene diisocyanate, hexamethylene diisocyanate and tetramethylene diisocyanate; alkylene diisocyanates such as propylene-1,2-diisocyanate; cycloalkylene diisocyanate such as 1,4-diisocyanatocyclohexane, as well as aromatic diisocyanate such as m- and p-phenylene diisocyanate, toluene diisocyanate, p,p'-diphenyl diisocyanate and 1,5-naphthalene diisocyanate, in which category we include aliphatic-aromatic diisocyanates such as p,p'-diphenylmethane diisocyanate and phenylethane diisocyanate

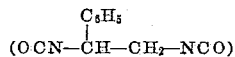

Triisocyanates are also suitable, such as those having isocyanate groups attached to a trivalent hydrocarbon radical, whether an aliphatic, aromatic, or aliphatic-aromatic radical as in butane-1,2,2-triisocyanate, benzene-1,3,5-triisocynate, diphenyl-2,4,4'-triisocyanate, diphenyl-4,6,4'-triisocyanate, toluene-2,4,6-triisocyanate, ethyl benzene-2,4,6-triisocyanate and triphenylmethane-4,4',4''-triisocyanate. Polyisocyanates derived from corresponding substituted hydrocarbon radicals, such as monochlorobenzene-2,4,6-triisocyanate, may also be used.

The poly-functional material, or polymer containing terminal hydroxyl groups, with which the foregoing polyisocyanate is reacted to provide the liquid prepolymer, is typically a substantially anhydrous polyester made from a glycol, for example, ethylene glycol or a mixture of glycols, and an aliphatic saturated dicarboxylic acid, for example, adipic acid, using an excess of glycol over the acid so that the resulting polyester contains terminal alcoholic hydroxyl groups. Such polyester may be linear, or it may be branched, the latter effect being achieved by including in the preparation a trialcohol, such as trimethylolpropane or trimethylolethane. However, it will be apparent to those skilled in the art of making polyurethane foams that only limited amounts of such trialcohols may be employed, otherwise the foam will not be flexible, as desired in the present invention. Usually such an amount of glycol is used as to give a polyester having a hydroxyl number of 225 to 22, and preferably 112 to 37, and a low acid number of less than 6 and preferably less than 1. In general, the most suitable polyesters are chiefly linear in type with melting point levels of 90° C. or lower. The molecular weight may range between the limits of 500 to 5,000, but is preferably within the range from 1,000 to 3,000. Many of the useful polyesters are obtained by a condensation reaction of one or more saturated alkyl dibasic acids or acid anhydrides and/or aryl dibasic acids or anhydrides with one or more saturated glycols. Thus, for example, good results are obtained using polyethylenepropylene adipate, having a molecular weight between 1,900 and 2,000, formed by esterifying a mixture of ethylene glycol and propylene glycol in a mole ratio of 70 to 30, respectively, with adipic acid. Other examples of suitable polyesters are polyethylene adipate, polyethylene adipate (70)-phthalate(30), polyneopentyl sebacate, etc.

As an alternative to the polyesters just described there may be used (for reaction with the polyisocyanate) one or more members of the class of elastomer-yielding polyethers. Such polyethers are typically anhydrous chain-extended polyethers possessing ether linkages (—O—) separate by hydrocarbon chains either alkyl or aryl in nature. The ether should also contain terminal groups reactive to isocyanate, such as alcoholic hydroxyl groups. Such polyether may be linear, or it may be branched. Usually the polyethers used are chiefly linear in type with melting point levels of 90° C. or lower. The molecular weight may range from 500 to 5,000 (i.e., hydroxyl number of about 225 to 22), but is preferably within the range of 750 to 3,500 (i.e., hydroxyl number of about 150 to 45). Examples of polyethers used are polyethylene glycol, polypropylene glycol, polypropylene-ethylene glycol, and polytetramethylene glycol.

Polyethers not only can be used in place of the polyester but can be used in conjunction with the polyester either as an added reagent or as an intimate part of the polyester molecule thus forming a poly-ether-ester. Examples of such poly-ether-esters are poly diethylene glycol adipate and poly triethylene glycol adipate. Also, in preparing the fluid pre-polymer, a polyamide can be used in conjunction with a polyester either as an added reagent or as an intimate portion of the polyester in the form of a polyester-polyamide. In the latter case a portion of the glycol to be used in the preparation of the polyester is replaced by a diamine such as hexamethylene diamine. An example of such a polyester amide is polyethylene glycol hexamethylene diamine adipate-adipamide. It will be understood that numerous other combinations of starting material, useful for preparing polyurethane foams, are now well known and the invention applies to all such known polyurethane foam systems.

The amount of polyisocyanate that is combined with the polyester, polyether, or similar poly-functional polymer, in preparing the polyurethane, frequently ranges from 1.0 to 1.25 equivalents of isocyanate for each equivalent of the total hydrogens reactive to isocyanate which are present in the polyester or the like. The invention frequently involves using from 1.02 to 1.9 moles of diisocyanate per mole of polyester or the like.

The diisocyanate or the like functions as a chain lengthening chemical with the polyester or the like, forming a urethane polymer. The resulting liquid polyurethane is termed the "pre-polymer" in this process.

In many cases it is found to be highly advantageous to include in the polyurethane pre-polymer preparation (in addition to the diisocyanate or the like and the polyester or the like), a small amount of an agent capable of forming urea linkages in the polymer. In general, such urea linkage forming agents are materials capable of condensing with the diisocyanate to yield at least one ureylene group

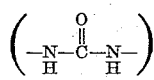

Although these agents should be bifunctional with respect to isocyanates, i.e., they should possess two available active hydrogen atoms, it is not necessary that these reactive groups both be —$NH_2$ groups. They are believed to act by combining with available isocyanate groups on different molecules of the pre-polymer, or with available isocyanate groups on different parts of the same molecule of the pre-polymer. The bifunctional ureylene linkage forming agents, when used at all, are suitably employed in an amount varying in specific cases from 0.3 to 3.5 moles per mole of polyester or polyether used but preferably varying from 0.1 to 0.6 mole per mole of polyester or polyether. Examples of such reagents are (a) aromatic diamines such as p,p'-diamino diphenyl methane, (b) aromatic mono amines such as p-aminophenol, m-aminophenol, and p-aminobenzylphenol, (c) aliphatic diamines such as hexamethylene diamine, (d) aliphatic monoamines such as ethanol amine, and (e) diamides such as adipamide or urea.

For the purpose of varying physical properties and/or structure of the polyurethane, other materials which are polyfunctional towards isocyanates may be added, such as glycols, mercapto-alcohols, di-acids, hydroxy acids, tri-hydroxy compounds, and tri-acidic compounds.

In some cases, it is desirable to accelerate or promote the reaction between the diisocyanate and the polyester or the like, and this may be done with the aid of certain catalytic materials. Known catalysts for this reaction include the soluble heavy metal salts, and the tertiary amines, the latter being preferred. Examples of such catalysts are cobalt naphthenate and diethyl cyclohexylamine.

It will be noted that the reaction of the polyester or the like with the diisocyanate is carried out under substantially moisture-free conditions, to yield the pre-polymer. The invention contemplates the ultimate conversion of this liquid pre-polymer into an elastomeric foam or sponge. This is accomplished by the action of water on the pre-polymer or on the polyurethane-forming materials. Water is a curing agent for the polyurethane. In general chemicals containing two or more hydrogen atoms available for reaction with the available isocyanate groups of the pre-polymer, notably water or organic chemicals in general containing two or more —OH and/or —$NH_2$ and/or —SH groups, are curing agents for the polyurethane polymer. For purposes of the invention the curing agent is appropriately comprised for the most part of water, since water is unique among the curing agents in causing the release of carbon dioxide gas during the cure so that the polyurethane becomes blown or expanded in situ by the generated gas. Because the water acts rapidly on the pre-polymer, it is not mixed with the pre-polymer until just before such liquid is to be cast or molded in the desired shape. The amount of water employed is typically from about 1 to 10, and preferably from about 2 to 7 parts by weight, based on 100 parts of pre-polymer or polyurethane-forming ingredients. In accordance with the invention, there is combined with the pre-polymer or polyurethane-forming ingredients, immediately prior to the casting operation, from 1 to 100 parts of starch, and preferably from 5 to 50 parts, per 100 parts of pre-polymer or polyurethane-forming ingredients. Frequently the final composition comprises 1 to 100 parts (preferably 5 to 50 parts) of starch per 100 parts of the polyurethane in the foam.

In the preferred form of the invention the pre-polymer is prepared from .04 to .005 mole of polyester, and .115 to .287 mole of diisocyanate. To the resulting liquid there is then added .01 to .045 mole of additional polyester or polyether which has been mixed separately with 5 to 100 parts of starch and 1 to 5 parts of water, preferably along with any desired catalysts or other modifying ingredients. The resulting mixture is a fluid that can easily be poured or similarly handled conveniently. Such liquid may be poured into a mold having the shape of the desired article, or it may be poured onto the surface of a continuously moving horizontal belt or the like (such belt being covered with a sheet of paper or similar separating medium). Within a very short time, the liquid starts to set up or cure, becoming preceptibly more viscous, and at the same time, carbon dioxide gas is generated by the action of the water on the polyurethane. This gas serves to blow and expand the mixture into the desired spongy condition at the same time that the mixture is curing. The curing and blowing are usually substantially completed within a period of 5 to 30 minutes at ordinary temperatures, or in a shorter time, e.g., 5 to 15 minutes at elevated temperatures, e.g., 100 to 200° F.

It is highly preferred to prepare the pre-polymer initially, with only a part of the total required amount of polyester or the like. The remainder of the polyester or the like is made up as a separate mix with the necessary water, along with any desired catalyst or other modifying ingredients, and, finally, the starch. The pre-polymer and the separate mix of remaining polyester or the like, water, and starch are combined just prior to the casting operation. Thus, we usually mix 100 parts of diisocyanate with from 100 to 200 parts of polyester or polyether to make a pre-polymer which is as yet deficient in polyester or polyether. Separately we mix from 100 to 200 parts of polyester or the like (to provide in the ultimate casting composition a total of 200 to 400 parts of polyester per 100 parts of diisocyanate) with 4 to 14 parts of water and 20 to 200 parts of starch. These two fluid mixes are combined to make the readily pourable casting composition. This procedure has been found to have several unobvious advantages among which may be mentioned shorter cure time, easier mixing and less shrinkage in the molded article because the cells formed are predominantly closed cells.

The cured elastomeric sponge is surprisingly found to possess an unusual combination of desirable characteristics. For one thing, it is most surprisingly found that the starch results in a foam having a higher modulus per unit density, in comparison to previously known polyurethane foams. Thus, conventional polyurethane foams without starch having a density of five pounds per cubic foot may have 50% compression deflections of from .75 pound to 2 pounds per square inch, while the corresponding starch extended foams of the invention will typically have 50% compression deflections of from 1 to 5 pounds per square inch. This has immense practical advantages in many applications, and renders the foams more useful, as will be apparent to those skilled in the art.

It is desired to point out that the peculiar action of the starch in the polyurethane foam is unique, in comparison to other fillers, in that the starch apparently acts as a true extender. Thus, when molding a particular article, for example a crash pad, 22 oz. of regular unextended polyester compound might be required to fill the pad. The same compound containing 50 parts of cornstarch per 100 parts of polyester by weight also required 22 oz. to fill the pad, indicating a true extension since in reality a large portion of the foam was starch in the second case. This is a most unexpected and useful finding, that is not shared, as far as the present inventors are aware, by other fillers.

Perhaps one of the most surprising and useful advantages resulting from the use of starch as described lies in the fact that the starch imparts to the foam the quality of shock absorption. An unfilled polyester or polyether urethane foam is usually "rubbery" or "lively" while the same compounds containing starch as a filler unexpectedly become stiff and "dead." This is a quality associated with good shock absorption.

The following examples will serve to illustrate the practice of the invention in more detail.

EXAMPLE 1

A. *Preparation of polyester*

A mixture of 27 moles of adipic acid, 28 moles of diethylene glycol, and 2 moles of 1,1,1-trimethylolethane plus 0.25 percent by weight of p-toluene sulfonic acid (based on the reaction mix) as a catalyst, was heated for 18 hours under nitrogen gas, at temperatures of 180°–200° C. water vapor being removed as formed. At the end of the reaction vacuum was applied to strip out any water remaining. The polyester thus obtained had a viscosity of 15,000 cp. (25° C.) and an acid number less than 2, a hydroxyl number of 60, a molecular weight of about 2480, and an equivalent weight of 920.

B. *Preparation of pre-polymer*

To make the pre-polymer, the following materials were stirred together at room temperature, yielding a somewhat viscous, but readily pourable, material:

| | Parts |
|---|---|
| Polyester resin prepared in A | 40.50 |
| Toluene diisocyanate (Hylene TM-65) | 35.00 |

C. *Preparation of catalyst masterbatch*

A masterbatch was then prepared from the following ingredients:

| | Parts |
|---|---|
| Polyester prepared in A | 59.50 |
| Wetting agent (e.g., non-ionic wetting agent, such as morpholine, which is a fatty acid soap of diethylene imide oxide) | 2.00 |
| Dimethyl stearylamine | 0.45 |
| Urea | 0.20 |
| Water | 3.30 |
| Cornstarch | 50.00 |

In making the foregoing masterbatch, the cornstarch was added last. (It will be understood that any other suitable conventional wetting agent may be substituted for the one shown.) The pre-polymer and the catalyst masterbatch were mixed together and poured into a waxed pan at room temperature and allowed to cure for 30 minutes with no application of heat. The result was a firm, flexible foam with good shock-absorbing qualities.

In place of cornstarch, other equivalent forms of starch, such as wheat starch, rice starch, potato starch or tapioca starch, may be substituted in the foregoing examples with similar results.

Polyethers may be substituted in the foregoing example, with equivalent results. In place of employing the "pre-polymer" technique of this example, a "one shot" technique, in which polyester or polyether as such and diisocyanate as such are mixed and injected into the mold, may be used.

Having thus described our invention, what we claim and desire to protect by Letters Patent is:

1. A flexible, shock-absorbing polyurethane foam comprising (A) 100 parts of a reaction product of from 1.02 to 1.9 moles of an organic diisocyanate and 1 mole of a polymer having a molecular weight of from 500 to 5,000 and having terminal alcoholic hydroxyl groups selected from the group consisting of polyesters and polyethers, (B) 1 to 10 parts of water, and (C) 1 to 100 parts of starch, said polyester being the sole polyester present and consisting essentially of a reaction product of a glycol with an aliphatic saturated dicarboxylic acid and said polyether having alkyl hydrocarbon chains separating ether linkages therein.

2. A flexible, shock-absorbing polyurethane foam comprising (A) 100 parts of a reaction product of from 1.02 to 1.9 moles of an organic diisocyanate and 1 mole of a polymer which is a polyester having terminal alcoholic hydroxyl groups, (B) 1 to 10 parts of water, and (C) 5 to 50 parts of starch, said polyester having a molecular weight of from 1,000 to 3,000 and being the sole polyester present and consisting essentially of a reaction product of a glycol with an aliphatic saturated dicarboxylic acid.

3. A flexible, shock-absorbing polyurethane foam comprising (A) 100 parts of a reaction product of from 1.02 to 1.9 moles of an organic diisocyanate and 1 mole of a polyether having terminal alcoholic hydroxyl groups, (B) 1 to 10 parts of water, and (C) 5 to 50 parts of starch, said polyether having a molecular weight of from 750 to 3,500 and having alkyl hydrocarbon chains separating the ether linkages therein.

4. A foam as in claim 2, in which the said diisocyanate is toluene diisocyanate and the said polyester is diethylene glycol adipate.

5. A method of making a flexible, shock-absorbing polyurethane foam comprising preparing a liquid pre-polymer by mixing from 1.02 to 1.9 moles of an organic diisocyanate with 1 mole of a polymer having terminal alcoholic hydroxy groups and having a molecular weight of from 500 to 5,000 selected from the group consisting of polyesters and polyethers, mixing 100 parts of the said pre-polymer with from 1 to 10 parts of water and with from 1 to 100 parts of starch, and immediately thereafter casting the resulting liquid mixture in a desired shape, whereby the mixture foams and cures to an expanded, elastomeric state, said polyester being the sole polyester present and consisting essentially of a reaction product of a glycol with an aliphatic saturated dicarboxylic acid and said polyether having alkyl hydrocarbon chains separating the ether linkages therein.

6. A method of making a flexible, shock-absorbing polyurethane foam comprising mixing 100 parts of an organic diisocyanate with from 100 to 200 parts of a polymer having terminal alcoholic hydroxyl groups selected from the group consisting of polyesters and polyethers to form a pre-polymer, separately mixing from 100 to 200 parts of a linear polymer selected from the said group with from 4 to 14 parts of water and from 20 to 200 parts of starch, and thereafter blending the two said mixes, said polymer having a molecular weight of from 500 to 5,000, said polyester being the sole polyester present and consisting essentially of a reaction product of a glycol with an aliphatic saturated dicarboxylic acid and said polyether having alkyl hydrocarbon chains separating the ether linkages therein.

7. A method as in claim 6 in which the said diisocyanate is toluene diisocyanate and the said polymer is a polyester as defined in claim 6.

References Cited in the file of this patent

UNITED STATES PATENTS

| | | |
|---|---|---|
| 2,764,565 | Hoppe et al. | Sept. 25, 1956 |
| 2,780,350 | Simon et al. | Feb. 5, 1957 |
| 2,846,408 | Brochhagen et al. | Aug. 5, 1958 |

FOREIGN PATENTS

| | | |
|---|---|---|
| 1,137,780 | France | Jan. 21, 1957 |

UNITED STATES PATENT OFFICE
CERTIFICATION OF CORRECTION

Patent No. 3,004,934            October 17, 1961

Lucian P. Dosmann et al.

It is hereby certified that error appears in the above numbered patent requiring correction and that the said Letters Patent should read as corrected below.

Column 6, line 57, for "bending" read -- blending --.

Signed and sealed this 10th day of April 1962.

(SEAL)
Attest:

ERNEST W. SWIDER

Attesting Officer

DAVID L. LADD

Commissioner of Patents